United States Patent [19]
Sallee

[11] Patent Number: 5,429,851
[45] Date of Patent: Jul. 4, 1995

[54] EXPANDABLE RIGID STRUCTURE

[75] Inventor: Bradley T. Sallee, Austin, Tex.

[73] Assignee: Tracor, Inc., Austin, Tex.

[21] Appl. No.: 57,296

[22] Filed: May 5, 1993

[51] Int. Cl.[6] .................................................. B32B 9/00
[52] U.S. Cl. .......................................... 428/71; 428/72;
428/75; 428/76; 428/83; 428/221; 244/159;
244/163; 52/2.11; 52/169.1; 52/169.6;
52/169.14
[58] Field of Search ........................ 428/71, 72, 75, 76,
428/178, 195, 192, 222, 221, 223, 83; 52/2.11,
169.1, 169.14, 169.6; 244/159, 163

[56] References Cited

U.S. PATENT DOCUMENTS 5,058,330 10/1991 Chow ..................................... 52/2.11
5,086,999 2/1192 Mullen .................................. 244/159

Primary Examiner—Patrick J. Ryan
Assistant Examiner—Abraham Bahta
Attorney, Agent, or Firm—Arnold, White & Durkee

[57] ABSTRACT

A rigid habitat structure is provided that is fabricated in an axially compressed condition so that it occupies less volume before it is expanded upon deployment. In a preferred embodiment, the structure is fabricated with a pleated metal skin forming a bellows-like structure. The structure may further comprise structural hoops and stringers connected to the metal skin. The structure may be transported to its desired location in its compressed condition and then deployed by inflating the structure to axially expand the bellows, whereby the metal skin and stringers are stretched into a straightened condition. Inflation may be continued past the elastic limits of the stringers and skin, thereby stiffening them in their expanded condition and creating a rigid expanded structure. Axially expandable micrometeorite shielding and thermal insulation are also provided that can be installed on the compressed structure and that expand along with the structure during deployment.

21 Claims, 3 Drawing Sheets

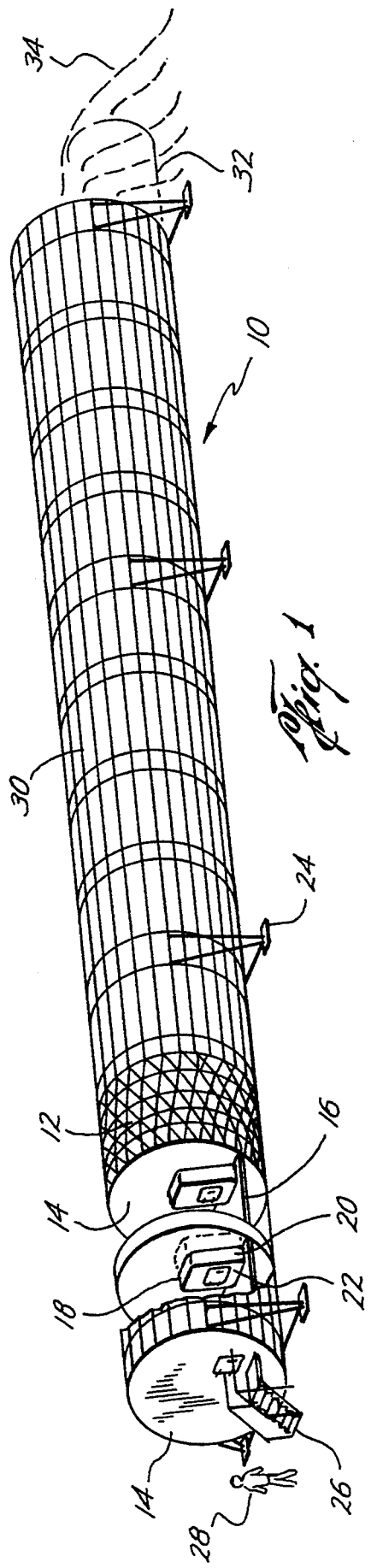
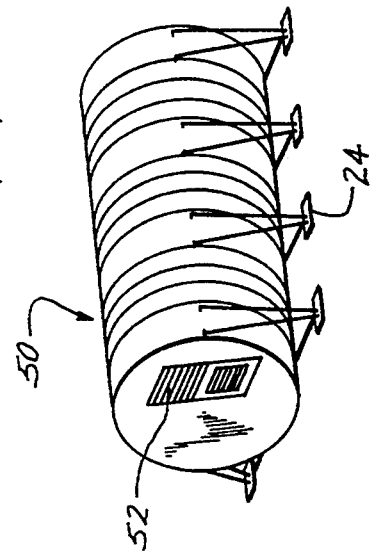
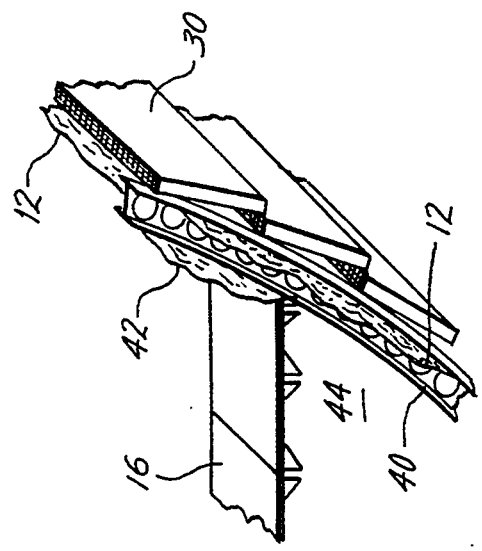

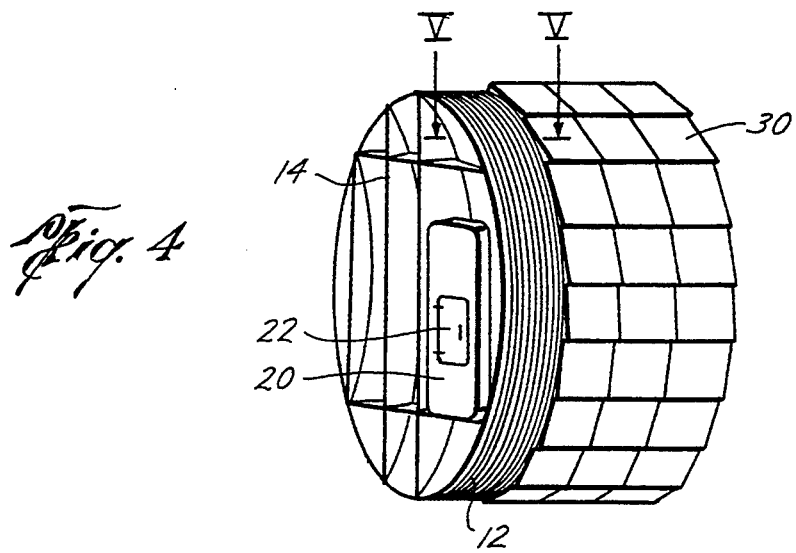
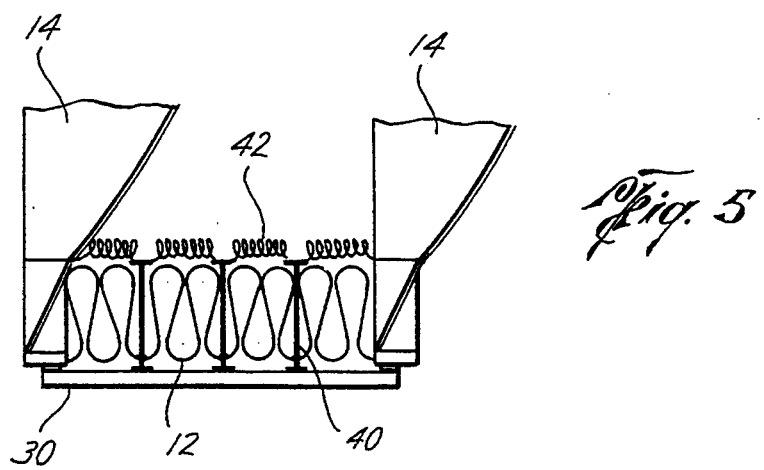
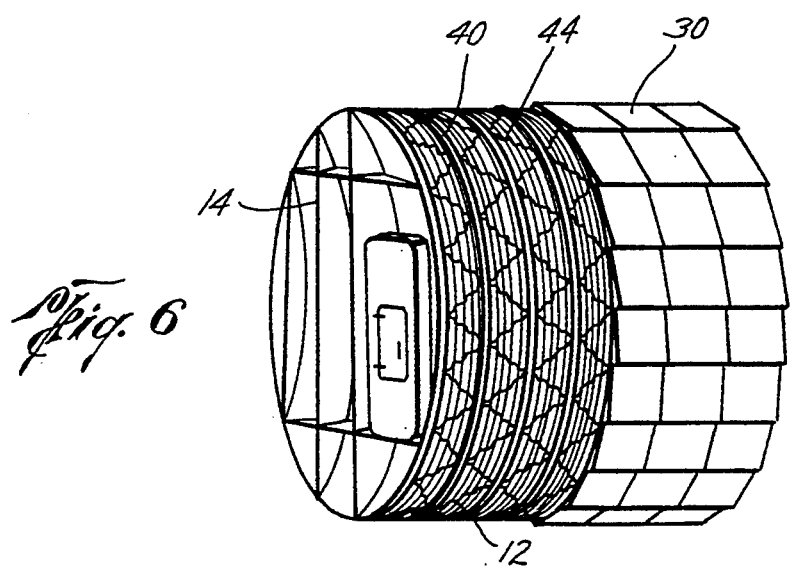

EXPANDABLE RIGID STRUCTURE

BACKGROUND OF THE INVENTION

1. Field of the Invention

This invention relates to enclosed, pressure bearing structures suitable for aerospace use, such as space station components and structures for use as lunar or planetary surface buildings suitable for human habitation. More specifically, this invention provides a bellows-shaped structure that can be transported, as by a rocket booster, in a relatively small volume and subsequently deployed and expanded to provide a rigid, pressure-bearing structure several times its initial compressed length. This invention may also be suitable for providing a structure for terrestrial or marine use, in particular for use in remote areas or hostile climates.

2. Discussion of the Prior Art

It is desired to provide an enclosed structure suitable for human habitation in hostile environments, in particular for use in space exploration and habitation of planetary or lunar surface environments. A number of such structures have been proposed in the past, including both rigid structures and non-rigid, inflatable structures. Structures suitable for habitation in non-terrestrial environments must be strong enough to support internal pressurization and the rigors of transport, handling and occupation. It is preferable that such structures be relatively easy to maintain, have a long usable life-span, and be incapable of catastrophic failure that would cause a sudden and complete loss of pressurization. Furthermore, space habitat structures are preferably low in weight and have low launch volumes, in order to decrease the expense, difficulty and risk of putting the structures into orbit for use in space.

The prior art provides both rigid and non-rigid structures. Rigid structures known in the art can be made adequately strong and durable, and they are relatively easy to maintain and repair. With proper choice of materials and construction techniques, the chance of catastrophic failure can be reduced to an acceptable level. Rigid structures, however, have unacceptably high launch volumes, requiring a large number of rocket flights to lift a desired number of such structures out of the earth's gravitational field and into space.

Non-rigid structures have also been proposed for similar applications, particularly inflatable fabric-based structures. This type of structure has the advantage of being low in weight and launch volume. It is capable of bearing pressurization, but it is more susceptible to catastrophic failure than is a rigid structure. If a fabric structure fails, it not only loses pressurization within itself, but, due to its lack of inherent rigidity, it can also compromise the stability of surrounding structures. Furthermore, inflatable fabric structures are not as durable as rigid structures and they are harder to maintain. Presently known designs would require frequent, more difficult repairs than would rigid structures.

Inflatable metal foil structures have been used for applications such as extendable booms on satellites, but the metal foil material does not have the strength and durability necessary for use in a structure intended for habitation. Furthermore, metal foil structures are typically stuffed into their containers, resulting in sharp folding and creasing of the foil material. This sharp folding is not detrimental for thin foil structures and the relatively low pressures that are usually applied to such structures. Such sharp folds in metal skin material become unacceptable as the thickness of the metal skin is increased to acceptable rigidity levels for use in relatively large rigid structures.

SUMMARY OF THE INVENTION

The rigid habitat of this invention comprises a structure that is initially formed as a pleated metal bellows-shaped tube that can be expanded to several times its initial length into a rigid tubular structure. This structure may be reinforced with rings and stringers using typical airframe construction designs. The expansion ratio may be at least five to one, thus allowing a large structure to occupy a relatively small launch volume. A micrometeorite shield and multi-layer insulator (MLI) may be included as an outer layer of the structure.

This invention incorporates the advantages of both the inflatable structures and the rigid structures known in the prior art. The structure according to the present invention provides a structure that can be expanded after being transported to its destination, thus allowing the number of launches needed to orbit a given number of structures to be greatly reduced by reducing the launch volume of each structure. This invention, in a preferred embodiment, provides a rigid structure that exhibits the durability and low maintenance of the rigid structures known in the prior art, while also providing the low launch volume of inflatable structures.

The rigid habitat structure of this invention may be constructed using standard aluminum construction techniques, employing rings and stringers as structural members and incorporating normal rip stop safety protection, but providing a structure that can be erected after launch from a compressed configuration. In preferred embodiments, the structure is fabricated in the compressed form, having the appearance of a metal bellows. The metal skin of the structure is folded into rounded pleats, along with desired structural members such as stringers that are attached to the skin. Pressure bearing bulkheads are installed to cover and seal each end of the tube formed by the pleated metal skin. Additional bulkheads may be installed within a module to divide it into separate sections or rooms. In a preferred embodiment, each room may be independently inflated and expanded. During deployment, the structure is over-pressurized internally, yielding the bellows-like structure axially and radially into a standard tank or fuselage structure. Because the yield strength of the material is exceeded during pressurization, the process is not reversible, and the strength and other structural properties of a rigid fabricated structure can be attained.

The compressed, pre-deployment structure according to this invention is manufactured by assembling the pleated bellows-shaped metal skin together with the stringers and rings. The pleats in the skin of the compressed structure are smooth pleats, not sharp folds. It is necessary to avoiding creasing and sharp bends, so that no regions of unusually high stress occur during the inflation and yielding process during deployment of the structure. The minimum permissible radius of curvature in the pleats will vary with the material type and thickness used for the skin.

Deployment of the structure according to a preferred embodiment takes place in three distinct, well-controlled steps. In the first step, at relatively low pressure, the habitat section elongates axially. During this stage stresses in the rings are negligible, stresses in the skin are below yield, and the stringers are pulled into a nearstraight condition. During the second stage of inflation the skin begins to yield outward, allowing the stringers to carry almost all the axial load of inflation. During this stage the yield point of the stringers is exceeded, resulting in stiffening the stringers into near final condition. In the last stage of the inflation process the skin continues to bulge radially outward between the rings and stringers in diaphragm loading until the yield point of the skin is exceeded and the diaphragm deflection lowers the skin stress below yield. This process is self-regulating and fairly insensitive to either inflation pressure tolerances or variations in material properties from one lot to the next. After the final inflation stage the pressure is lowered back to normal inhabitation pressure. The excess gas may be vented into an adjoining section or into another module and thereby used to inflate another similar structure.

The micrometeorite shield/multi-layer insulator according to this invention may be employed to cover and protect at least a portion of the exterior surface of the metal skin of the structure. Such a shield panel may be fabricated from titanium foil arranged in a honeycomb shaped configuration, which can be mounted on the collapsed, pleated structure prior to launch. This shield then expands with the structure during deployment as the honeycomb cavities are opened and elongated and the foil material is ultimately stretched beyond its elastic limit to form a rigid panel.

Bulkhead walls are used to seal each end of the structure according to the invention, as well as to provide walls separating sections or rooms within a single structure module. In preferred embodiments, each section can be inflated separately during deployment. Airlocks and transfer rooms can be disposed in bulkhead walls as needed. The transfer room associated with an airlock can be formed using a technique similar to that of the overall structure. The transfer room structure may comprise a metal skin which is fabricated in a pleated bellows-like configuration. The transfer room itself can then be expanded by inflation during deployment, similar to the way in which the overall structure is expanded. Air-tight doors are generally provided at each end of a transfer room.

The presently preferred embodiments of this invention contemplate its use primarily for use in space exploration activities. It is suitable for use as a space-station module, where it is rigid enough after deployment to serve as a habitable structural member of a multiple module construct. A structure according to this invention could also be used individually as an orbiting habitation or warehouse. Alternatively, a structure according to this invention may be deployed on the surface of a planet or a moon for use as living and working quarters for persons working in such environments. The rigidity of the structure permits it to also be used for terrestrial missions into hazardous or inhospitable environments. Even without internal pressurization the structure is rigid enough to hold loads of snow or soil. By appropriate design and selection of materials, a structure for underwater use may be constructed according to this invention. Particularly in a marine application, the structure may be inflated with a fluid other than air, such as with water. It will be apparent that a person of skill in the art, having the benefit of this disclosure of this invention, may conceive of numerous other applications for which this invention will be beneficial. Nothing in this disclosure limits the application of the invention claimed herein to the embodiments and the applications expressly described herein.

The present invention therefore provides an improved habitat structure suitable for use in space exploration and habitation, which provides the strength and durability of a conventional rigid structure, but which occupies a considerably lower launch volume. This invention avoids the problems associated with conventional means and structures, by providing a rigid metal structure which can be transported to a desired location in a substantially compressed form and then easily expanded by inflation. This and other advantages of the present invention will be further appreciated from the drawings and the detailed description provided below.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

FIG. 1 is a perspective view of one embodiment of the deployed rigid habitat according to a preferred embodiment, showing at its left end some layers of the structure cut away so that underlying features become visible.

FIG. 2 is a perspective view of the rigid habitat according to this invention prior to inflation and deployment.

FIG. 3 is a cut-away view of a wall of the structure according to this invention illustrating various components of the structure.

FIG. 4 illustrates a segment of a structure according to this invention prior to deployment.

FIG. 5 is a cross-sectional view of a section of a structure according to this invention, illustrating the pleated bellows shape of the metal skin prior to inflation.

FIG. 6 is a perspective view of the structure section illustrated in FIG. 4 after it has been partially expanded.

FIG. 8A shows this structure in its original compressed condition, while FIG. 8B illustrates the foil after it has been expanded to a honeycomb shape. FIG. 8C illustrates the metal foil after it has been expanded beyond its yield point to its final deployed configuration.

DETAILED DESCRIPTION OF PREFERRED EMBODIMENTS

Figure 7:
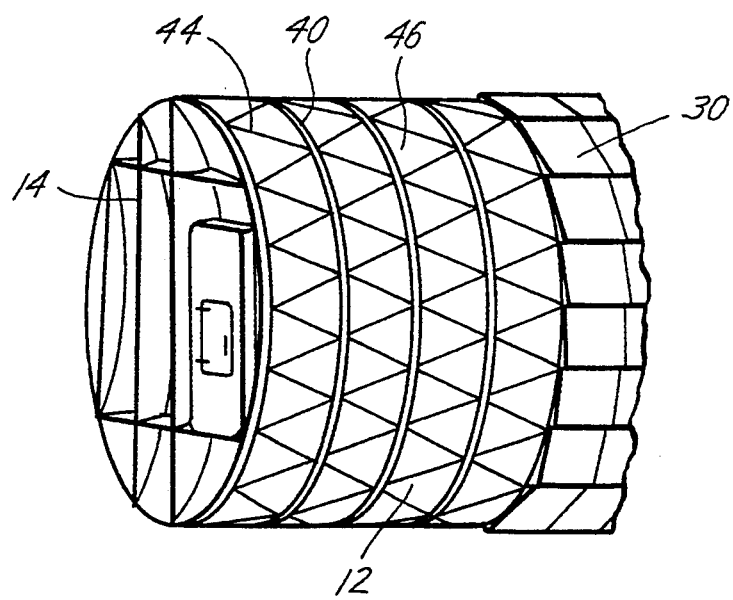
FIG. 7 is also a perspective view of the structure section illustrated in FIGS. 4 and 6 after it has been fully expanded to its final rigid shape.

FIG. 1 illustrates the features of a deployed and expanded rigid structure 10 that exemplifies a preferred embodiment of this invention. The illustrated embodiment includes three interconnected modules, each module having four sections or rooms. In the cutaway section near the left side of the figure, expanded metal skin 12 may be seen. The structure and operation of the metal skin is described in detail below. The rooms are separated by pressure bulkheads 14 which may be equipped with airlocks 18. Each airlock consists of doors 22 into the adjoining rooms and a small transfer room 20. After the structure has been expanded, floor panels 16 are installed to provide a suitable walking surface within the tubular structure. Stabilizing braces 24 are installed on the outside of the structure at preselected intervals in order to stabilize the structure and prevent it from rolling or shifting both during and after expansion. In a preferred embodiment, this structure is approximately fifteen feet in diameter, and each module is approximately forty-six feet long. Each of the four rooms within each module of this embodiment is approximately eight feet long (useful space), measured parallel to the axis of the structure. These dimensions are intended only as examples, and this invention as defined by the claims may be designed and constructed in any desired size and proportion. Access stairs 26 can be provided external to the structure for access to an airlocked door. Human FIG. 28 is shown in FIG. 1 to provide a sense of scale to the drawing.

The structure shown in FIG. 1 is designed to be employed in space applications, such as lunar and planetary exploration and the proposed space station. In all of these applications, protection must be provided from micrometeorites and radiation. In addition, efficient thermal insulation is required. Shield panels 30 cover the external surface of the preferred embodiment of this structure when it is deployed to provide micrometeorite shielding as well as multi-layer thermal insulation (MLI). These panels are described in detail below. If necessary, a radiation shelter covered with soil can be constructed according to the structural techniques of this invention. Such a radiation shelter 32 is shown at the right hand end of the structure of FIG. 1. The radiation shelter 32 is preferably an expandable rigid structure constructed in a pleated bellows-like configuration similar to the modules of the main structure, and it is similarly expanded upon deployment by internal pressurization. Once inflated and expanded, this invention provides a structure that is rigid enough to bear the weight of soil 34 which is used to cover the radiation shelter, even if internal pressurization is removed from the shelter section. This rigidity is provided by stressing the metal of the shelter walls beyond its elastic limit, causing it to stiffen in the desired expanded configuration.

Each of the connected modules shown in FIG. 1 may have its own life support system, and each room or section may be separated from the adjoining rooms by pressure bearing bulkheads and airlocks. Thus, in the event of a failure of the metal skin in any one room, the occupants of that room can escape into an adjoining room that is unaffected by the failure. Furthermore, in the event of a more serious failure of the metal skin, or of the life support system in any one of the modules, the occupants of a module can escape to an adjoining module where independent pressurization and life support systems remain operable. Of course, pressurization and other life support systems may be designed and implemented as needed for any given application within a structure employing the invention claimed and described in this application.

FIG. 2 shows the embodiment of FIG. 1 in its original compressed condition before it has been expanded by introduction of pressurized air into the structure. The bellows-type fabrication technique of this invention is employed in order to substantially reduce the launch volume of a relatively large deployed structure. Even the airlock 52 shown in FIG. 2 is fabricated as a bellows, which is inflated to form a rigid transfer room during deployment. This invention permits, in a preferred embodiment, a ratio of approximately five to one between deployed length and transportable length of this structure. Even in its original, compressed configuration, the structure has a substantial amount of interior volume that can be utilized during launch or other transport to contain desired equipment and supplies, such as for example floor panels, life-support systems and deployment (inflation) equipment.

FIG. 3 is a cutaway detail drawing of the wall of the rigid structure according to this invention after it has been expanded and deployed. In a preferred embodiment, the structure is designed to be similar to a conventional ring-and-stringer airframe after expansion. Rings 40 and stringers (not shown) provide structural strength and a rip-stop effect. Metal skin 12 is attached to rings 40 and stringers 44. In the presently preferred embodiment, the metal skin, stringers and rings are fabricated from aluminum. A living wall 42 may line the interior of a structure according to this invention. This living wall protects the primary rigid load-bearing skin from damage caused by persons and objects inside the structure.

FIG. 3 shows other features that may be utilized beneficially in conjunction with the structure of this invention. Shield panels 30 in their expanded form, providing protection from micrometeorites and thermal insulation. Floor panels 16 may be installed after deployment of the structure, providing a suitable walking surface as well as storage space 44 within the structure beneath the floor panels. This space 44 may be used to hold life support equipment, raceways for electrical and plumbing connections, as well as storage for supplies, water, and other equipment. Rather than placing life support equipment beneath the floor, as suggested above, a bulkhead section may be employed as a module interface ring containing gas storage, life support systems, and other utilities.

In a preferred embodiment, the metal skin which forms the pressure wall may be 25 mil aluminum sheet. The interior living wall 42 may be constructed of zeppel coated nomex, as well as other flexible and impermeable materials known in the art.

FIG. 4 shows a more detailed view of one module of the embodiment shown in FIGS. 1 and 2. In this figure, metal skin 12 has not yet been expanded, nor have shield panels 30. In a preferred embodiment, shield panels are provided independently for each of the four rooms within the module. This permits the module to be inflated and expanded one room at a time, thereby reducing the amount of pressurized gas required for deployment. As each room is expanded and over-pressured, the high pressure gas present in that room can be vented into the next room to initiate expansion of said next room. As discussed previously, each module ends with a pressure bulkhead 14 which is designed to maintain pressurization within the module as well as to withstand overpressurization during deployment of the module.

FIG. 4 also shows that airlock 20 is constructed with a bellows-type structure that is similar to the metal skin of the structure. Means are provided for introducing pressurized air into the interior of the transfer room of the airlock to expand that room into the desired shape.

FIG. 5 shows a cross-sectional view of a portion of the embodiment of FIG. 4, showing the pleated, bellows-shaped metal skin prior to expansion. FIG. 5 shows the wall for one section or room having pressure bulkheads 14 at each end. Rings 40 are provided for structural support, and they are illustrated as I-beams, although other types of beams are also suitable for use in this invention. Metal skin 12 is fastened to rings 40, for example by welding, and pleated or folded into a smooth bellows-like shape between the rings without forming any sharp corners or creasing, which would cause unacceptably uneven stresses to occur in the skin that would create a risk of perforation or rupture of the skin during deployment. Living wall 42 is also attached in a pleated configuration between rings 40. In an alternative embodiment, rings 40 may be omitted and pleated skin 12 coupled directly between two bulkheads. The skin 12 and stringers 44, if used, are preferably fabricated in the pleated configuration and attached to rings 40 as shown. Other fabrication methods for constructing this invention will be apparent to those of skill in the art.

Shield panel 30 is attached between bulkheads 14, preferably with removable fasteners so that shield panels may be replaced when they are damaged by micrometeorite impact or other occurrences. In the preferred embodiment, stringers are also connected to the metal skin 12 between rings 40. These stringers comprise straps or channel members that provide structural support to the skin, as well as providing a means for interrupting any tears that may develop in the metal skin. (The stringers are not shown in FIG. 5.) The stringers are preferably continuously connected to the skin, as by welding, although other fastening techniques may also be used.

The deployment procedure is illustrated by the sequence of FIGS. 4, 6 and 7. FIG. 6 shows the module of FIG. 4 after it has been partially expanded by introduction of gas under pressure into the interior of the leftmost room of the module. Again, the shield panels 30 are not shown in the vicinity of the room being expanded so that the expansion of the metal skin 12 can be observed. The stringers 44 can also be observed in this figure. They are attached to the metal skin 12, preferably by welding, as well as to rings 40. The preferred configuration as shown provides triangular shaped panels of the metal skin 12 bounded by stringers 44 and rings 40. A penetration or other failure of metal skin 12 within any one of these triangular panels will not result in a tearing of the metal skin beyond a stringer or a ring. As air or other fluid is pumped into the room being expanded during the deployment process, the pleats of the metal skin, which were shown in FIG. 5, become straightened out and eventually the metal skin becomes substantially flat.

Stringers 44 may be substantially rectangular in cross-section (i.e., straps), as well as any other desired shape, such as U-channel. Stringers 44 are preferably fabricated with bends to match the pleats of the metal skin to which they are to be connected.

The following discussion assumes that the fluid used to inflate the structure during deployment is air. Other fluids may be used to provide the pressure differential required to expand the structure of this invention. As air is introduced into the room being expanded, the stringers 44 as well as the metal skin 12 are pulled axially due to tension produced by air pressure acting on the bulkheads at each end of the room. As additional air is pumped into the room, the stringers eventually become substantially straightened, and when their yield point is reached and exceeded, their stiffness increases and they become rigid in the expanded configuration, preventing further stretching (without a substantial increase in pressure. Because the elastic limit of stringers 44 and metal skin 12 is exceeded during expansion, this is a non-reversible process, and the structure cannot be recompressed to its initial condition after it has been expanded.

Referring now to FIG. 7, after the stringers have been pulled to a fully expanded configuration, the stringers bear the axial load resulting from pressurization of the section, and further pressurization of the section produces diaphragm loading and radial outward deflection of the skin 12 of each triangular (for example) panel 46 bounded by rings 40 and stringers 44. The pressure within the room is increased until this diaphragm loading exceeds the yield point of skin 12. When this happens the stiffness of the skin increases and it attains a permanent, rigid shape deflected slightly outward from the substantially planar triangle formed by the stringers 44 and the rings 40. The stresses in the skin 12 decrease rapidly as the skin panels deflect outwardly between stringers 44. This limits the overall deflection of the structure without being sensitive to material tolerances or inflation pressure variations. Due to the characteristic increase in stiffness attained by a metal such as aluminum after its yield point has been exceeded, the over pressurization of this structure during deployment causes the compressed, somewhat flexible bellows shaped structure of FIG. 2 to be expandable into a rigid expanded structure as shown in FIG. 1. The rigidity of this structure is not dependent upon continued internal pressurization. Indeed, such a structure might be suitable for marine applications where the external pressure is substantially greater than the internal pressure. In such a case, it would be preferable to inflate the structure during deployment with water rather than with air, in order to safely provide the additional pressure that would be required to expand the heavier pleated skin that would be required to withstand the external pressure underwater.

As mentioned above, the radiation shelter of the preferred embodiment, which is constructed according to this invention, may be made stout enough using this invention to withstand being buried by soil for radiation protection.

Figure 8A:
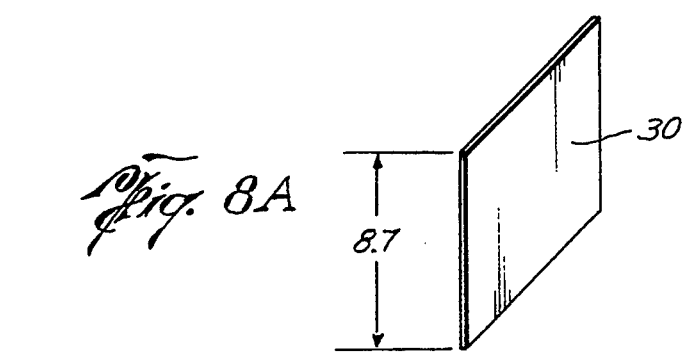
FIGS. 8A, 8B and 8C illustrate expansion of the metal foil honeycomb micrometeorite shield that is utilized in a preferred embodiment of this invention.
Figure 8B:
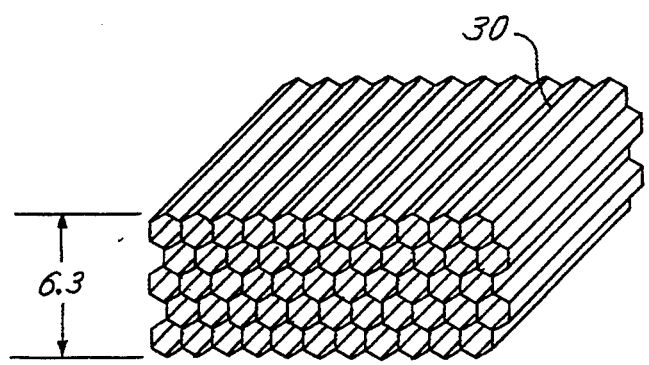
Figure 8C:
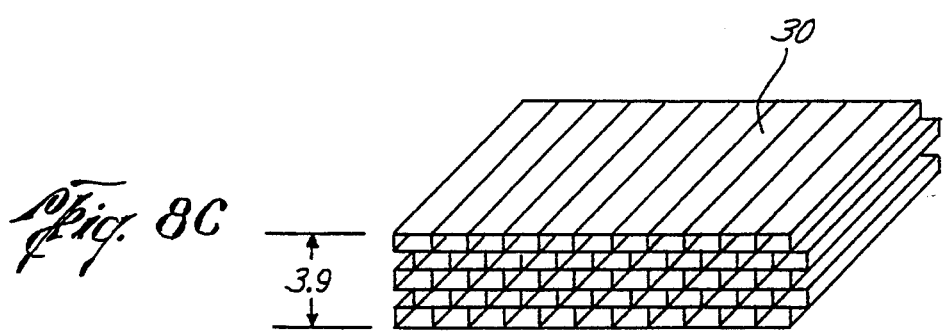

While not shown in FIGS. 4, 6 and 7, in the preferred embodiments shield panels 30 cover the room being expanded as well as the remainder of the structure. Shield panels 30 expand axially along with the metal skin 12 as the bulkheads are pushed apart by air pressure. FIG. 8A, 8B and 8C detail the structure and expansion of a preferred embodiment of shield panels 30. FIG. 8B shows the metal foil honeycomb structure that is employed to construct shield panels 30. FIG. 8A shows the compressed form of this honeycomb structure which in the illustrated embodiment is approximately 8.7 inches in thickness. Shield panels 30 are fabricated from compressed honeycomb and attached to the rigid habitat structure in the compressed form of FIG. 8A or in a slightly expanded form (between the form shown in FIG. 8A and that shown in FIG. 8B). When a section of a module is being expanded during deployment, as described above, shield panel 30 is stretched by movement of the bulkheads 14 to which it is attached, first into the honeycomb configuration shown in FIG. 8B, and then into the further elongated configuration shown in FIG. 8C. Like the stringers and metal skin, shield panels 30 are designed such that the metal foil is stretched slightly beyond its yield point during expansion of the structure during deployment, thereby increasing the hardness of the metal and providing a self-supporting rigid structure. As shown in FIG. 3, shield panels 30 may be designed to overlap one another in order to provide shingle-like coverage to the structure. As noted previously, shield panels 30 are preferably removably attached to the structure, both to provide access to the exterior surface of the metal skin if necessary and to permit replacement of panels as needed, for example if a panel is damaged by meteorite impact. As indicated in FIG. 8C, in a preferred embodiment, the final thickness of shield panel 30 is approximately 3.9 inches. Honeycomb foil material, as is shown in FIG. 8B, is known in the art and is preferably constructed from titanium, although other suitable materials may be employed.

In an alternative embodiment, shield panels 30 are not mounted on the compressed structure and expanded with the structure, but instead may be carried separately and attached to the structure after it has been expanded and deployed.

The cross sectional shape of the structure of this invention may be elliptical or rectangular (with rounded corners), as well as cylindrical. Irregular shapes may also be constructed, although it is preferable to avoid sharp corners that would preclude even expansion during deployment.

Because of the over-inflation and the yielding that takes place within the metal skin 12 and the stringers 44 of the rigid structure constructed and deployed according to this invention, the same strength and other structural properties are achieved as if the structure was fabricated at full size in the normal manner, but the advantages of the invention, primarily substantially lower launch volume, are attained as well.

I claim:

1. A habitat structure comprising an inflatable, irreversibly expansible bellows including a tubular pleated skin configured to define a rigid elongate chamber upon expansion of the bellows.

2. The structure of claim 1, further comprising a plurality of support rings coupled to said pleated skin at preselected intervals.

3. The structure of claim 1, further comprising reinforcing members coupled to the pleated skin.

4. The structure of claim 1 wherein at least one of the pleats comprises an axially foldable tubular member.

5. The structure of claim 1 wherein the pleated skin comprises a material which takes a permanent set when stretched beyond its elastic limit.

6. A habitat structure for use in space comprising: a plurality of coaxially disposed support rings; and an irreversibly expansible, annular pleated skin interconnecting each pair of adjacent support rings to define an inflatable tubular bellows.

7. The structure of claim 6, further comprising a bulkhead enclosing each end of the bellows, thereby defining an enclosed interior space inside of the bellows.

8. The structure of claim 6, wherein the pleated skin comprises metal sheet.

9. The structure of claim 6, wherein the pleated skin comprise aluminum sheet.

10. The structure of claim 6, further comprising at least one reinforcing member coupled to the pleated skin.

11. The structure of claim 10, wherein the reinforcing members comprise aluminum stringers.

12. A habitat structure for use in space, comprising: an inflatable, irreversibly expansible tubular bellows including a plurality of coaxially disposed support rings, reinforced annular pleated skin interconnecting adjacent rings, and a bulkhead enclosing each end of the bellows to define an enclosed space inside of the bellows.

13. A method of deploying the habitat structure of claim 12, comprising: introducing a fluid into the enclosed space formed by the combination of the bellows and the bulkheads to inflate the structure sufficiently to expand the pleated skin beyond the elastic limit of the pleated skin such that the pleats are permanently deformed into an expanded condition.

14. A method of forming a rigid structure comprising:
providing an enclosed cylinder formed of a pleated, bellows-shaped metal skin with a longitudinal center axis and bulkheads for enclosing the ends of the cylinder;
inflating said cylinder to axially expand said cylinder until said originally bellows-shaped metal skin is substantially straightened;
increasing the inflation pressure applied to said cylinder until the yield point of the metal skin has been exceeded, thereby stiffening the metal skin in a non-pleated condition and forming a rigid cylinder from said metal skin.

15. The method of claim 14, further comprising fastening rings and reinforcing members to said bellows-shaped metal skin prior to inflating said cylinder.

16. The method of claim 15, wherein said fastening step further comprises arranging said rings and reinforcing members to provide panels of said metal skin bounded by said rings and stringers.

17. The method of claim 16, wherein the increasing the pressure step comprises: first increasing the pressure to axially stress the reinforcing members and to exceed the yield point and thereby stiffen the reinforcing members, and second continuing to increase the pressure to deflect the panels of metal skin radially outward until the yield point of the metal skin is exceeded and thereby stiffening the panels.

18. A inflatably erectable rigid habitat structure, comprising:
a pleated, bellows-shaped metal skin;
a plurality of supporting rings attached to said metal skin at spaced intervals;
a plurality of stringers connected between said rings and attached to said metal skin, said stringers conforming to the bellows shape of the metal skin before the structure is inflated;
pressure bearing bulkheads attached to each end of said metal skin forming an enclosed internal space that can be inflated to expand the bellows-shaped metal skin and stringers to form an expanded rigid structure.

19. The habitat structure of claim 18, further comprising metal foil honeycomb material coupled to an outer surface of said structure, said foil honeycomb being expandable upon inflation of the structure to form an insulating shield substantially covering at least a portion of the outer surface of the expanded structure.

20. The structure of claim 19, wherein said foil honeycomb comprises titanium.

21. The structure of claim 18, further comprising an airlock coupled to at least one of said bulkheads to permit passage of persons and materials through the bulkhead without allowing a substantial quantity of air to enter or exit the structure, the airlock comprising:

an inflatably expandable airlock chamber comprising a bellows-shaped metallic tube sealably coupled to said pressure bulkhead, said airlock chamber being inflatable to a preselected shape and size, and said airlock chamber becoming rigid upon inflation past the yield point of the metal tube;

an air-tight door operably coupled to said chamber.

* * * * *

UNITED STATES PATENT AND TRADEMARK OFFICE
CERTIFICATE OF CORRECTION

PATENT NO. : 5,429,851

DATED : July 4, 1995

INVENTOR(S) : Bradley T. Sallee

It is certified that error appears in the above-identified patent and that said Letters Patent is hereby corrected as shown below:

In claim 16, column 10, line 36, after 'and', insert --said-- therefor.

Signed and Sealed this

Tenth Day of October, 1995

Attest:

BRUCE LEHMAN

*Attesting Officer*        *Commissioner of Patents and Trademarks*